United States Patent
Aoyama

(10) Patent No.: US 9,106,836 B2
(45) Date of Patent: Aug. 11, 2015

(54) IMAGING APPARATUS, CONTROL METHOD FOR THE SAME, AND RECORDING MEDIUM, WHERE CONTINUOUS SHOOTING OR SINGLE SHOOTING IS PERFORMED BASED ON TOUCH

(75) Inventor: Satoshi Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 13/605,786

(22) Filed: Sep. 6, 2012

(65) Prior Publication Data

US 2013/0063645 A1 Mar. 14, 2013

(30) Foreign Application Priority Data

Sep. 9, 2011 (JP) .................. 2011-196786

(51) Int. Cl.
*H04N 5/222* (2006.01)
*H04N 5/225* (2006.01)
*H04N 5/232* (2006.01)
*H04N 5/343* (2011.01)
*H04N 5/235* (2006.01)

(52) U.S. Cl.
CPC ....... *H04N 5/23293* (2013.01); *H04N 5/23245* (2013.01); *H04N 5/343* (2013.01); *H04N 5/2356* (2013.01)

(58) Field of Classification Search
None
See application file for complete search history.

(56) References Cited

U.S. PATENT DOCUMENTS

| 8,780,214 B2 * | 7/2014 | Ishii et al. | 348/208.16 |
|---|---|---|---|
| 2010/0020221 A1 * | 1/2010 | Tupman et al. | 348/333.01 |
| 2010/0231777 A1 * | 9/2010 | Shintani et al. | 348/333.06 |
| 2010/0257251 A1 * | 10/2010 | Mooring et al. | 709/216 |
| 2012/0162464 A1 * | 6/2012 | Kim | 348/223.1 |
| 2012/0317516 A1 * | 12/2012 | Ohsumi | 715/849 |
| 2013/0179831 A1 * | 7/2013 | Izaki | 715/800 |
| 2014/0071323 A1 * | 3/2014 | Yi et al. | 348/333.01 |

FOREIGN PATENT DOCUMENTS

| JP | 11-136568 A | 5/1999 |
|---|---|---|
| JP | 11-212726 A | 8/1999 |
| JP | 2001-76162 A | 3/2001 |
| JP | 2010-226319 A | 10/2010 |
| JP | 2011-60209 A | 3/2011 |
| JP | 2011-113469 A | 6/2011 |

* cited by examiner

*Primary Examiner* — Tuan Ho
*Assistant Examiner* — Shahbaz Nazrul
(74) *Attorney, Agent, or Firm* — Canon USA Inc. IP Division

(57) ABSTRACT

A shooting target detection unit detects a main shooting target from a position where a touch-down operation is performed on a touch panel. A system control device causes a ranging control device and an exposure control device to perform AF processing and AE processing on the main shooting target. The system control device displays a continuous shooting switch near the touched position. The system control device performs continuous shooting if a user moves his/her finger to the continuous shooting switch and then performs a touch-up operation. Whereas, the system control device performs single shooting if the user performs the touch-up operation without moving his/her finger to the continuous shooting switch.

10 Claims, 13 Drawing Sheets

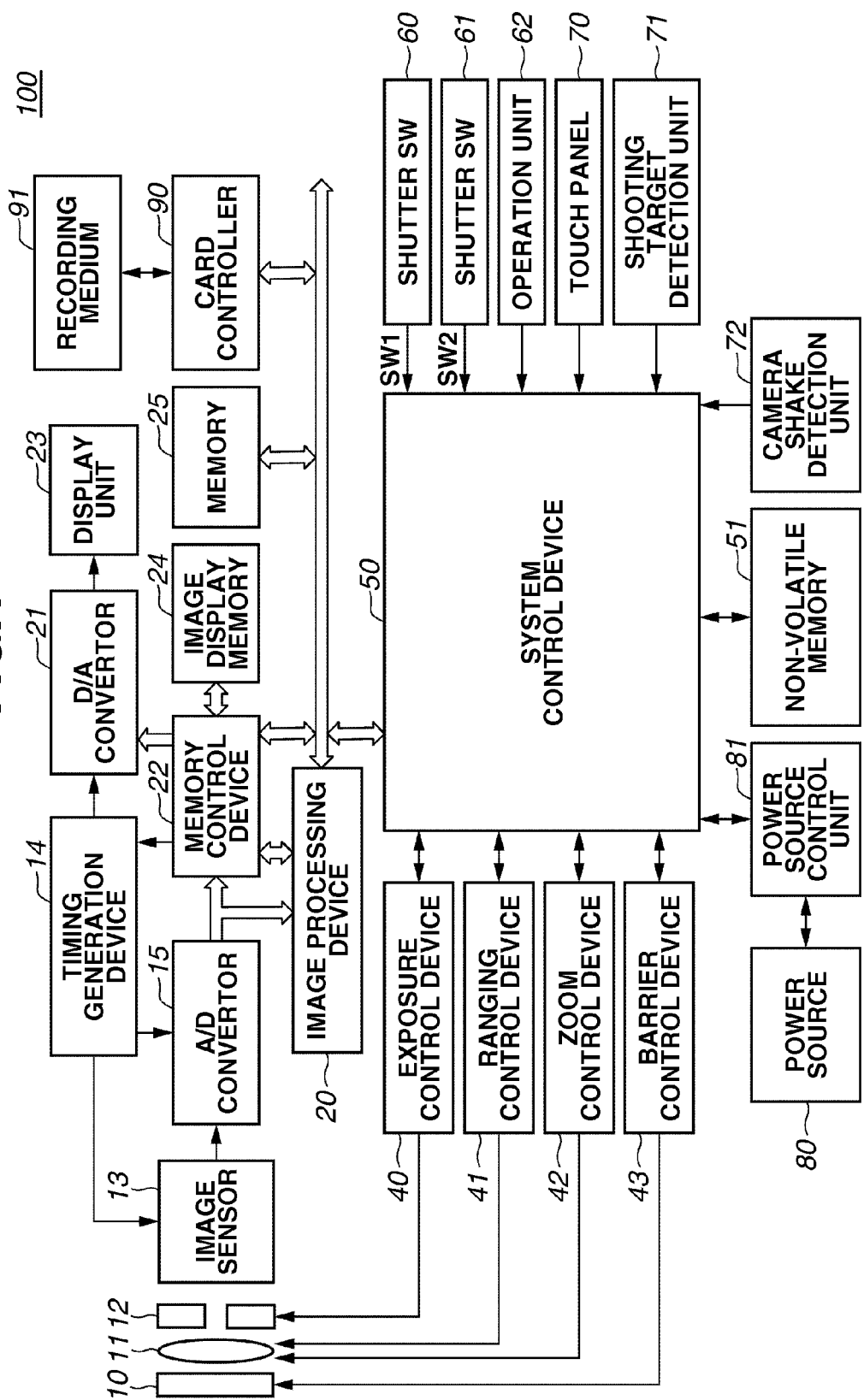

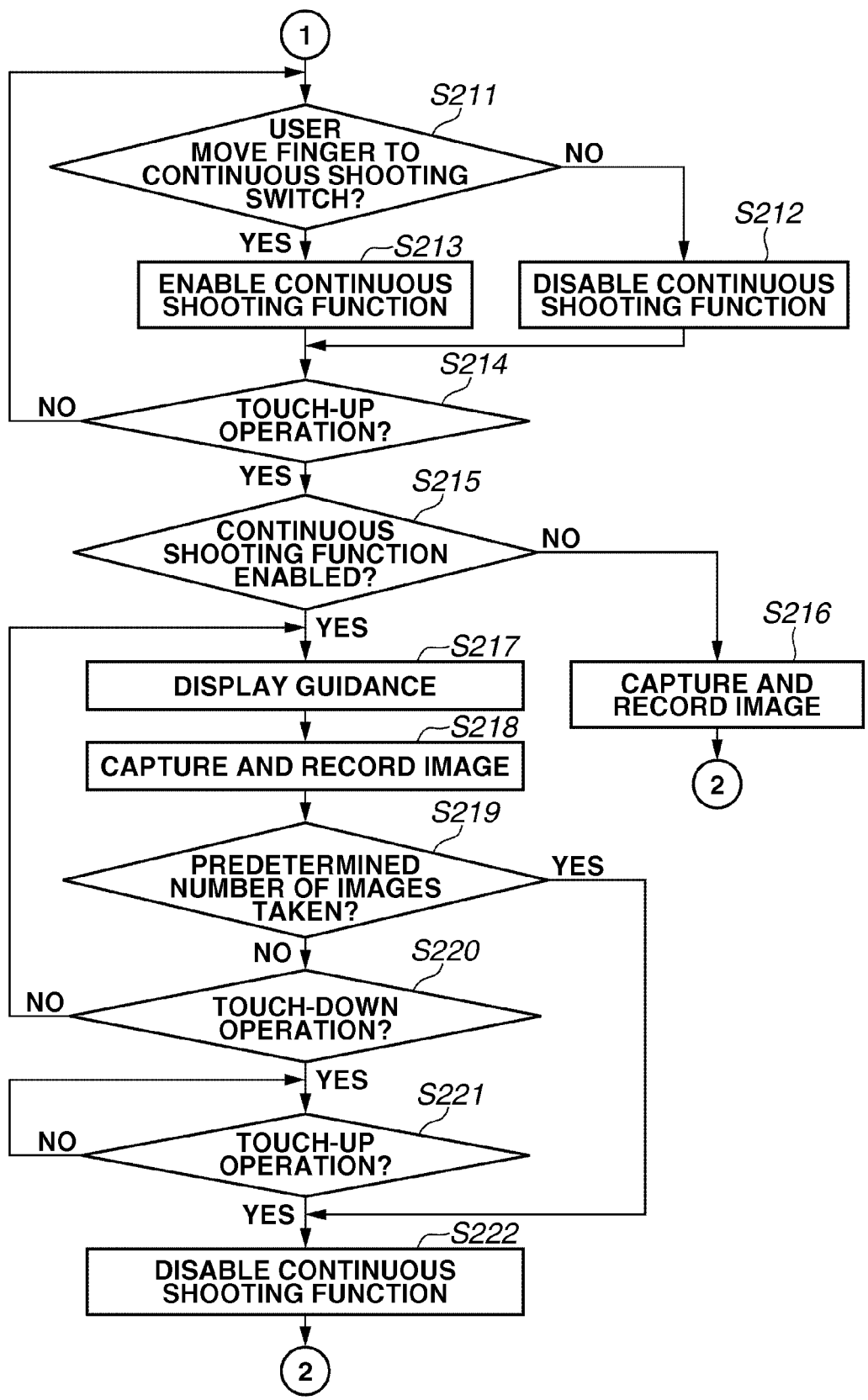

IMAGING APPARATUS, CONTROL METHOD FOR THE SAME, AND RECORDING MEDIUM, WHERE CONTINUOUS SHOOTING OR SINGLE SHOOTING IS PERFORMED BASED ON TOUCH

BACKGROUND OF THE INVENTION

1. Field of the Invention

The claimed invention generally relates to imaging and, more particularly, to an imaging apparatus including a touch panel, a control method therefor, a program, and a recording medium.

2. Description of the Related Art

Small terminals provided with touch panels enable an intuitive operation when they are used in combination with graphical user interfaces (GUIs). There are commercialized digital cameras with touch panels mounted at their display units.

Japanese Patent Application Laid-Open No. 11-136568 discusses an imaging apparatus configured to detect a main shooting target based on a touched position on a touch panel, perform exposure adjustment and focus adjustment according to the main shooting target, and capture an image of the main shooting target.

Japanese Patent Application Laid-Open No. 11-212726 discusses an imaging apparatus configured to display a mark representing a shutter switch and a mark representing a zoom switch near a touched position on a touch panel, and capture an image at the timing when a user separates his/her finger from the touch panel. Japanese Patent Application Laid-Open No. 11-212726 also discusses that the zoom magnification is changed according to a movement of the touched position.

Imaging apparatuses can receive various types of operations, in addition to an operation for still image shooting. For example, as types of still image shooting, there are single shooting for capturing a single still image in response to a single full-pressing operation, and continuous shooting for capturing images at predetermined intervals as long as the switch is kept fully pressed. Japanese Patent Application Laid-Open No. 11-136568 and Japanese Patent Application Laid-Open No. 11-212726 discuss techniques for performing the single shooting using the touch panels, but do not discuss a method or technique for realizing the continuous shooting. The conventional techniques are configured to capture an image or record an image in a recording medium at the timing when a user separates his/her finger from the touch panel, and therefore cannot introduce an operation corresponding to continuous full-pressing of the shutter button.

Imaging apparatuses using touch panels for a shooting operation are desired to be configured to allow users to select continuous shooting by a simple operation. Further, imaging apparatuses are desired to be configured to allow users to select continuous shooting by an easy operation when necessary.

SUMMARY OF THE INVENTION

The claimed invention is directed to an imaging apparatus capable of realizing various types of operations such as an operation for switching single shooting and continuous shooting and an operation for performing continuous shooting while using a touch panel, a control method therefor, a program, and a recording medium.

According to an aspect of the claimed invention, an imaging apparatus includes an imaging unit, a touch panel, an imaging preparation unit configured to conduct a preparation for imaging processing of the imaging unit based on a position where a touch-down operation is performed on the touch panel, and a control unit configured to cause the imaging unit to perform continuous shooting according to a touch-up operation in a case where an operation for instructing about continuous shooting is performed on the touch panel since execution of the touch-down operation until execution of the touch-up operation, and cause the imaging unit to perform single shooting according to the touch-up operation in a case where the operation for instructing about continuous shooting is not performed on the touch panel since the execution of the touch-down operation until the execution of the touch-up operation.

Further features and aspects of the claimed invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

FIG. 1 is a block diagram schematically illustrating a configuration of an exemplary embodiment of the claimed invention.

FIGS. 2A and 2B are flowcharts illustrating shooting processing according to a first exemplary embodiment.

DESCRIPTION OF THE EMBODIMENTS

Figure 2A:
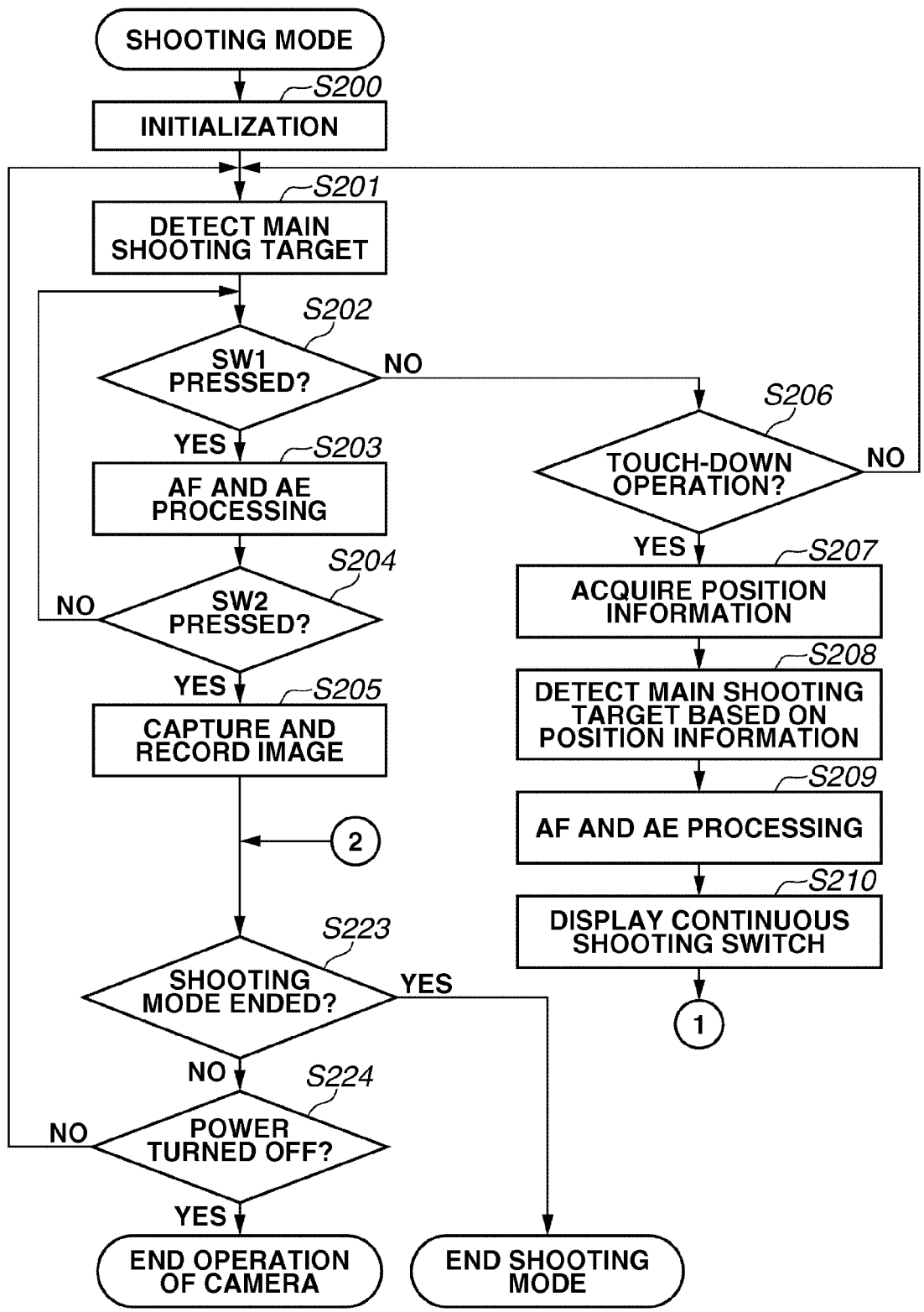

Various exemplary embodiments, features, and aspects of the claimed invention will be described in detail below with reference to the drawings.

FIG. 1 is a block diagram schematically illustrating a digital camera 100 that is a first exemplary embodiment of an imaging apparatus according to the claimed invention.

A barrier or protection member 10 covers an imaging unit including a shooting lens 11 of the digital camera 100, thereby preventing the imaging unit from being contaminated or damaged.

The digital camera 100 includes the shooting lens 11, a shutter 12 having a diaphragm function, an image sensor 13 configured to convert an optical image into an electric signal, and an analog-to-digital (A/D) convertor 15 configured to convert an analog signal output of the image sensor 13 into a digital signal.

A timing generation device 14 is configured to supply a clock signal and a control signal to the image sensor 13, the A/D convertor 15, and a digital-to-analog (D/A) convertor 21, and is controlled by a memory control device 22 and a system control device 50.

An image processing device 20 performs pixel interpolation processing, color conversion processing, and automatic white balance (AWB) processing on image data from the A/D convertor 15 and image data from the memory control device 22. Further, the image processing device 20 has a compression/decompression function of compressing and coding image data stored in a memory 25, and decompressing compressed image data. The data processed by the compression/decompression function is returned to the memory 25.

Further, the image processing device 20 performs calculation processing for exposure control and focusing control using image data acquired by imaging processing, and supplies the calculation result to the system control device 50. The system control device 50 causes an exposure control device 40 and a ranging control device 41 to perform automatic exposure (AE) processing and automatic focus (AF) processing, respectively, according to the calculation result of the image processing device 20. If the digital camera 100 is provided with a flash device, the exposure control device 40 also performs flash pre-emission (EF) processing.

The memory control device 22 controls the A/D convertor 15, the timing generation device 14, the image processing device 20, an image display memory 24, the D/A convertor 21, and the memory 25. The output data of the A/D convertor 15 is written in the image display memory 24 or the memory 25 via the image processing device 20 and the memory control device 22, or via the memory control device 22.

The digital camera 100 further includes the image display memory 24, the D/A convertor 21, and a display unit 23 constituted by a thin-film transistor liquid crystal display (TFT LCD), or the like. The display image data written in the image display memory 24 is converted into an analog signal by the D/A convertor 21, and is supplied to the display unit 23. The display unit 23 sequentially displays captured images, thereby functioning as an electronic finder for displaying a live video image (through-the-lens image).

The memory 25 stores image data constituting, for example, a captured still image and a captured moving image, and has a storage capacity sufficient to store a predetermined number of still images or a moving image corresponding to a predetermined time length. Further, the memory 25 is also used as a working area of the system control device 50.

The exposure control device 40 controls the shutter 12 having the diaphragm function. The ranging control device 41 controls focusing of the shooting lens 11. A zoom control device 42 controls zooming of the shooting lens 11. A barrier control device 43 controls the protection member 10, which serves as a barrier.

The system control device 50 controls the entire digital camera 100. A non-volatile memory 51 is electrically erasable and recordable, and is embodied by, for example, an electrically erasable programmable read-only memory (EEPROM). The non-volatile memory 51 stores not only a control program for the system control device 50 but also, for example, map information. The system control device 50 may be in the form of one or more processors and/or one or more application specific integrated circuits (ASIC), or the like, to execute the various functions of digital camera 100.

A shutter switch (SW1) 60 is turned on in the middle of an operation of a not-illustrated shutter button (half-pressing of the shutter button). When the shutter switch 60 is turned on, the system control device 50 instructs the image processing device 20, the exposure control device 40, and the ranging control device 41 to start processing such as the AF processing, the AE processing, the AWB processing, and the EF processing.

A shutter switch (SW2) 61 is turned on upon completion of the operation of the not-illustrated shutter button (full-pressing of the shutter button). When the shutter switch 61 is turned on, the system control device 50 starts recording processing for recording image data captured by the image sensor 13 in an external recording medium 91.

The recording processing includes exposure processing, development processing, and storage processing. The exposure processing is processing for writing an image signal read out from the image sensor 13 in the memory 25 via the A/D convertor 15 and the memory control device 22. The development processing is processing for generating uncompressed image data with use of calculation by the image processing device 20 or the memory control device 22. The storage processing is processing for reading out the image data from the memory 25, compressing the image data by the image processing device 20, and writing the compressed image data in the external recording medium 91 via a card controller 90.

An operation unit 62 is used to input various types of operation instructions of the system control device 50. The operation unit 62 is constituted by any one of or combinations of a switch, arrow keys, a dial, a touch panel, a pointing device based on detection of a line of sight, a speech recognition device, and the like In terms of individual functions, the operation unit 62 includes, for example, a power button; a mode changeover switch for switching the mode of the digital camera 100 among a shooting mode, a reproduction mode, a moving image mode, and another special shooting mode; a changeover button for switching the shooting mode among a single shooting mode, a continuous shooting mode, and a self-timer mode; and a button for starting/stopping moving image shooting. As operation members used for settings or the like, the operation unit 62 includes, for example, a menu button, arrow keys, a set button, a date/time setting button, an exposure correction button, a captured image quality selection button, a menu item scroll + (plus) button, and a menu item scroll − (minus) button. Further, the operation unit 62 includes, for example, a reproduced image scroll + (plus) button and a reproduced image scroll − (minus) button for reproduction.

A touch panel 70 is provided integrally on a screen of the display unit 23. An input coordinate of an operation on the touch panel 70 can be associated with a coordinate (display coordinate) on the screen of the display unit 23 one by one. This configuration realizes a GUI that can provides a user with an operational feeling as if the user directly operates an object displayed on the screen of the display unit 23.

The system control device 50 can detect the following operations performed on the touch panel 70. An operation of touching the touch panel 70 with a pen or a finger (hereinafter referred to as "touch-down" operation). An operation of keeping touching the touch panel 70 with a pen or a finger (hereinafter referred to as "touch-on" operation). An operation of moving a finger or a pen while keeping touching the touch panel 70 with the finger or the pen (hereinafter referred to as "move" operation). An operation of separating a finger or a pen that has been touching the touch panel 70 therefrom (hereinafter referred to as "touch-up" operation). A state in which nothing has touched on the touch panel 70 (hereinafter referred to as "touch-off" operation).

The touch panel 70 notifies the system control device 50 of these operation types and positional coordinates that a finger or a pen touches on the touch panel 70. The system control device 50 determines what kind of operation is performed on the touch panel 70 based on the notified information. For the move operation, the system control device 50 can determine the direction in which a moving finger or pen moves on the touch panel 70 based on a change in the positional coordinates for each of a vertical component and a horizontal component on the touch panel 70.

Suppose that a user draws a stroke by performing the touch-down operation on the touch panel 70, performing the move operation in a certain direction, and then performing the touch-up operation. The operation of quickly drawing a stroke is referred to as "flick". The flick is an operation of quickly moving a finger by a certain distance while keeping touching the touch panel 70 with the finger, and then subsequently separating the finger from the touch panel 70, i.e., an operation of quickly running a finger on the touch panel 70 as if flicking the finger at the touch panel 70. The system control device 50 determines that the flick operation is performed when detecting that the move operation is performed by a predetermined distance or longer at a predetermined speed or higher, and then the touch-up operation is performed subsequently. On the other hand, the system control device 50 determines that a drag operation is performed when detecting that the move operation is performed by a predetermined distance or longer at a speed lower than the predetermined speed.

As types of touch panels, there are various types such as a resistive film type, a capacitance type, a surface acoustic wave type, an infrared type, an electromagnetic induction type, an image recognition type, and an optical sensor type. In the present exemplary embodiment, the touch panel 70 may be embodied by any type of touch panel.

A shooting target detection unit 71 detects a shooting target regarded as a main shooting target in captured image data. The shooting target detection unit 71 includes image processing such as face detection processing for detecting a face of a person, individual authentication processing for detecting a specific person, and object detection processing for detecting an object to be imaged.

A camera shake detection unit 72 detects a shake of the digital camera 100. The camera shake detection unit 72 includes a vertical/horizontal placement sensor configured to detect an orientation of the digital camera 100, an acceleration sensor, and a gravity sensor. The camera shake detection unit 72 detects a shake of the digital camera 100, and outputs an amount and a direction of the shake at that time.

The digital camera 100 further includes a power source control unit 81 and a power source 80 constituted by, for example, a primary battery such as an alkaline battery and a lithium battery, a second battery such as a nickel-cadmium (NiCd) battery, a nickel-metal hydride (NiMH) battery, and a lithium (Li) battery, and an alternating-current (AC) adapter.

The card controller 90 reads and writes data from and to the external recording medium 91 such as a memory card.

FIGS. 2A and 2B are flowcharts illustrating processing by the digital camera 100 during shooting. The program recorded in the non-volatile memory 51 is loaded to the memory 25 to be executed by the system control device 50, so that the processing illustrated in FIGS. 2A and 2B is realized.

The digital camera 100 is started up in response to pressing of the power button included in the operation unit 62. An operation mode at this time is an operation mode selected and set by the mode changeover switch included in the operation unit 62. If the mode of the digital camera 100 is set to a shooting mode by the mode changeover switch, the digital camera 100 is started up in the shooting mode.

In step S200, the system control device 50 performs initialization of the digital camera 100 for the shooting mode. More specifically, the system control device 50 activates and initializes various control units used to capture an image as a target by the digital camera 100 to prepare for shooting. Further, the system control device 50 starts a display of a through-the-lens image.

In step S201, the system control device 50 sequentially inputs image data captured by the image sensor 13 to the shooting target detection unit 71, and the shooting target detection unit 71 detects a person or an object that is supposed to be a main shooting target from the image data. The system control device 50 may notify a user of the detected main shooting target by displaying a frame surrounding the detected main shooting target while superimposing the frame on a live video image displayed on the screen of the display unit 23.

Figure 7A:
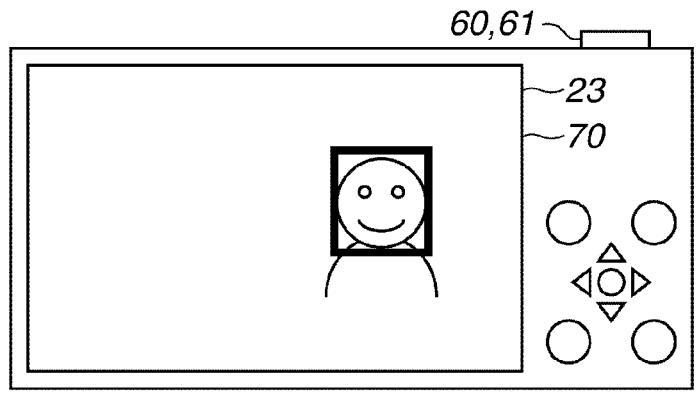
FIGS. 7A to 7D each illustrate an example of a display screen.

FIG. 7A is a display example of the digital camera 100. For example, in the example illustrated in FIG. 7A, the system control device 50 detects a face of a person within the image, and displays a frame at the position of the face displayed on the display unit 23 based on detected face information. By this display, the system control device 50 can notify the user of the fact that the face of the person is detected within the field of view for shooting and the detected face is determined as the main shooting target.

In step S202, the system control device 50 determines whether the shutter switch 60 (SW1) is pressed. If the system control device 50 determines that the shutter switch 60 (SW1) is pressed (YES in step S202), then in step S203, the system control device 50 performs a shooting preliminary preparation including the AF processing and the AE processing using main shooting target information detected in step S201.

In step S204, the system control device 50 determines whether the shutter switch 61 (SW2) is pressed. If the system control device 50 determines that the shutter switch 61 (SW2) is pressed (YES in step S204), then in step S205, the system control device 50 controls the respective units so as to record a captured image in the external recording medium 91.

In step S223, the system control device 50 determines whether the mode of the digital camera 100 is switched from the shooting mode to another operation mode using the mode changeover switch. If the mode of the digital camera 100 is changed from the shooting mode (YES in step S223), then the system control device 50 ends the shooting mode.

In step S224, the system control device 50 determines whether the power button is pressed so that the digital camera 100 is instructed to be turned off. If the digital camera 100 is instructed to be turned off (YES in step S224), the system control device 50 terminates the operation of the digital camera 100.

In step S202, if the system control device 50 determines that the shutter switch 60 is not pressed (NO in step S202), in step S206, the system control device 50 determines whether the user touches the screen of the touch panel 70 (performs the touch-down operation) by his/her finger, for example.

If the touch-down operation is performed (YES in step S206), in step S207, the system control device 50 acquires position information on the screen where the touch-down operation is performed from the touch panel 70.

In step S208, the system control device 50 converts the acquired position information on the screen to the position information in the image data. The shooting target detection unit 71 sets a target existing on the position where the touch-down operation is performed to the main shooting target using the position information of the touch-down operation.

Figure 7B:
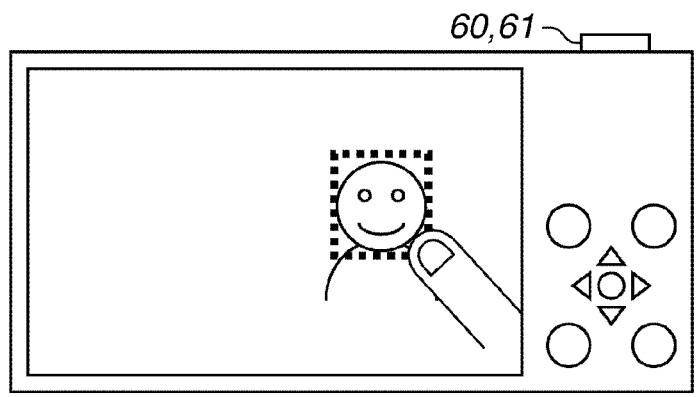

In step S209, the system control device 50 performs shooting preparation processing including the AF processing and the AE processing using the main shooting target information detected in step S208. The system control device 50 functions as a shooting preparation unit. Accordingly, the digital camera 100 is set into a shooting preparation state. FIG. 7B illustrates a display example after the AF processing and the AE processing. FIG. 7B illustrates that the AF processing is performed on the main shooting target existing at the position where the touch-down operation is performed, and then the result indicating an in-focus state or an out-of-focus state is displayed as a frame that is different from the frame displayed before the shooting preparation. Whether the main shooting target is in focus or out of focus may be notified to the user based on a change in the display color of the frame, or based on an issuance/absence or a change of an output sound by, for example, a beep sound output unit (not illustrated).

Figure 7C:
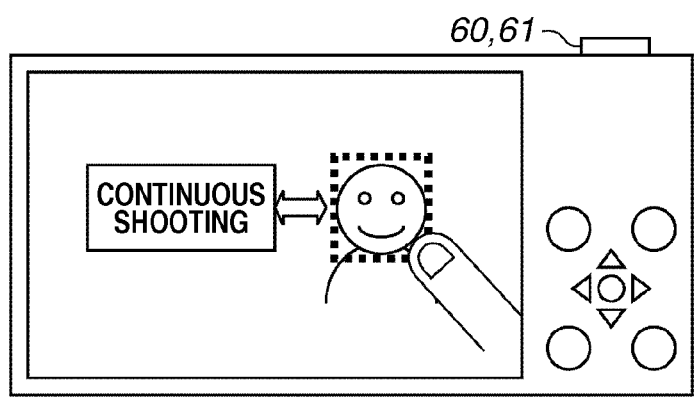

In step S210, the system control device 50 displays a continuous shooting switch allowing the user to issue an instruction for continuous shooting at a position predetermined relative to the position where the touch-down operation is performed. FIG. 7C illustrates a display example of the continuous shooting switch. The continuous shooting switch is displayed at a position relative to the position where the touch-down operation is performed. The continuous shooting switch can be displayed at a position easy to be noticed by the user according to the position where the touch-down operation is performed.

In step S211, the system control device 50 determines whether the user moves his/her finger (performs the move operation) to the position of the continuous shooting switch displayed in step S210 while keeping touching the screen from the touch-down operation. If the user does not move his/her finger (does not perform the move operation) from the position where the user performs the touch-down operation to the position of the continuous shooting switch (NO in step S211), in step S212, the system control device 50 disables the continuous shooting function.

Whereas, if the user moves his/her finger (performs the move operation) from the position whether the user performs the touch-down operation to the position of the continuous shooting switch as if running his/her finger on the screen (YES in step S211), in step S213, the system control device 50 enables the continuous shooting function. In the present exemplary embodiment, the user can instruct the digital camera 100 to perform continuous shooting in this manner.

In step S214, the system control device 50 determines whether the user separates his/her finger (performs the touch-up operation) from the screen of the touch panel 70. If the user does not perform the touch-up operation and keeps touching the screen (NO in step S214), the processing returns to step S211. If the system control device 50 determines that the user performs the touch-up operation (YES in step S214), the system control device 50 advances the processing to step S215.

In step S215, the system control device 50 determines whether the continuous shooting function is enabled. If the continuous shooting function is disabled (NO in step S215), in step S216, the system control device 50 causes the digital camera 100 to capture an image, and record the captured image data in the external recording medium 91. As a result, if the user performs the touch-up operation without moving the user's finger (without performing the move operation) from the position where the user touches after performing the touch-down operation, the digital camera 100 captures an image at the timing of the touch-up operation, i.e., performs single shooting.

If the system control device 50 determines in step S215 that the continuous shooting function is enabled (YES in step S215), in step S217, the system control device 50 displays a guidance indicating that the continuous shooting is in progress on the screen of the display unit 23. By this guidance, the digital camera 100 can notify the user of the progress status of the continuous shooting, how to stop the continuous shooting, or the like.

In step S218, the system control device 50 causes the digital camera 100 to capture images, and record the captured image data in the external recording medium 91.

In step S219, the system control device 50 determines whether a predetermined number of images is captured by the continuous shooting. The predetermined number for continuous shooting when the continuous shooting function is enabled may be set to the digital camera 100 in advance, or the user may set or select a desired number therefor by the menu or the like. If the predetermined number of images is captured (YES in step S219), in step S222, the system control device 50 ends the continuous shooting and disables the continuous shooting function. Then, the system control device 50 advances the processing to step S223. If the system control device 50 determines in step S219 that the predetermined number of images is not captured (NO in step S219), the proceeding proceeds to step S220.

In step S220, the system control device 50 determines whether the touch-down operation is performed again. If the touch-down operation is not performed again (NO in step S220), the processing returns to step S217, and then the system control device 50 causes the digital camera 100 to repeatedly capture images to continue the continuous shooting. If the system control device 50 determines that the touch-down operation is performed again (YES in step S220), the system control device 50 ends the continuous shooting, and is kept in a standby state until the touch-up operation is performed in step S221. In step S221, if the touch-up operation is performed (YES in step S221), then in step S222, the system control device 50 disables the continuous shooting function.

Figure 7D:
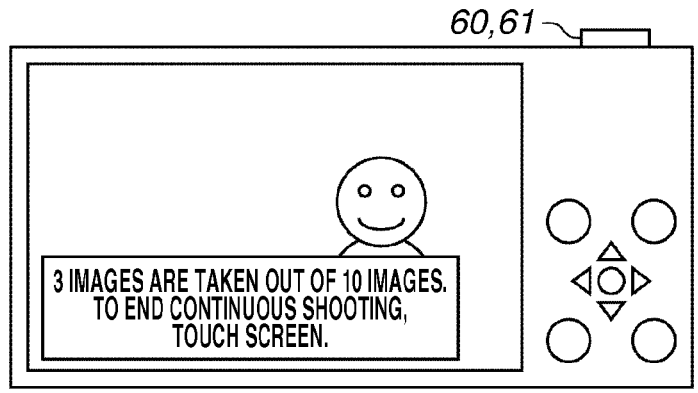

In this way, when the user runs his/her finger to the continuous shooting switch to instruct the digital camera 100 to perform continuous shooting, and then performs the touch-up operation, the digital camera 100 starts continuous shooting. The digital camera 100 continues the continuous shooting until the number of images captured by the continuous shooting reaches the predetermined number or the user performs the touch-down operation again. FIG. 7D illustrates a display example during execution of continuous shooting. The guidance for notifying the user of the maximum number of images to be captured by the continuous shooting, the number of images captured until now, and the fact that the continuous shooting can be stopped by the touch-down operation is displayed during the continuous shooting.

Figure 3A:
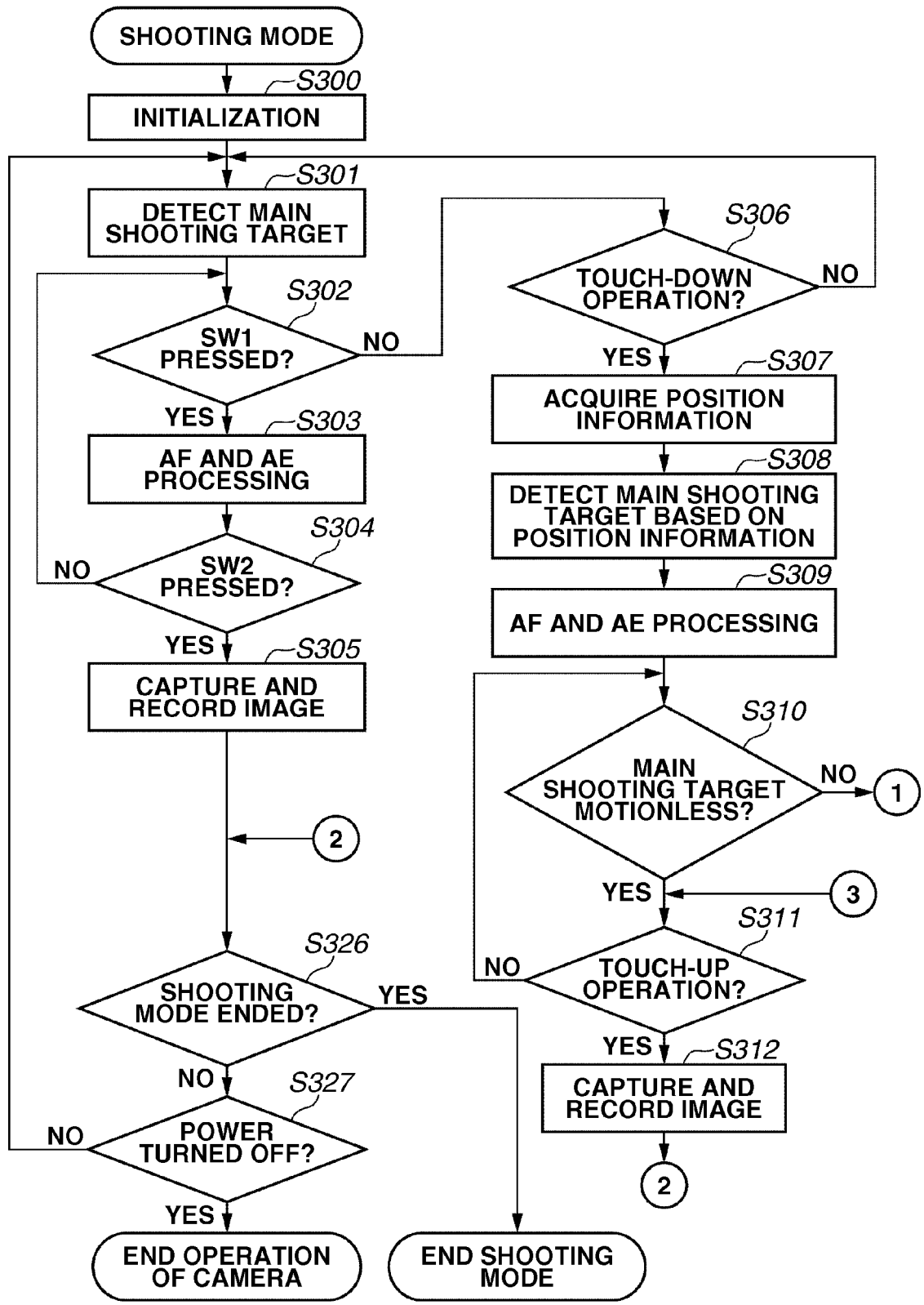
FIGS. 3A and 3B are flowcharts illustrating shooting processing according to a second exemplary embodiment.
Figure 3B:
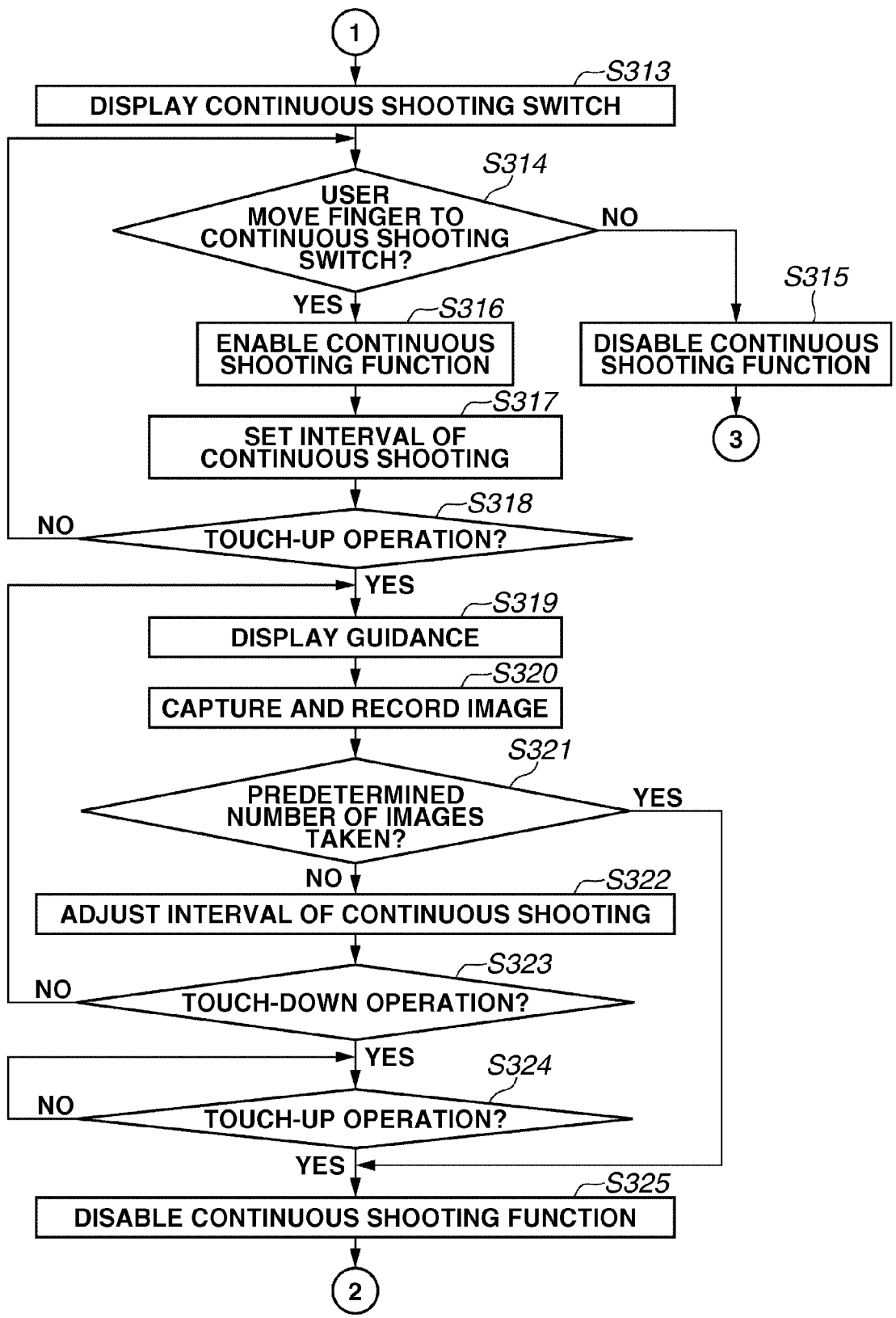

A second exemplary embodiment will be described as an example in which the digital camera 100 recommends continuous shooting to a user when a main shooting target is moving. FIGS. 3A and 3B are flowcharts illustrating the processing during shooting according to the second exemplary embodiment. The program recorded in the non-volatile memory 51 is loaded to the memory 25 to be executed by the system control device 50, so that the processing illustrated in FIGS. 3A and 3B is realized.

The processing in steps S300 to S309 is similar to that in steps S200 to S209, and therefore the description thereof will be omitted.

In step S310, the system control device 50 determines whether the main shooting target is motionless. More specifically, the shooting target detection unit 71 stores a history of position information when detecting the main shooting target, and the system control device 50 determines whether the main shooting target is motionless with reference to this history. If the main shooting target is motionless (YES in step 310), in steps S311 and S312, the system control device 50 causes the digital camera 100 to capture an image at the timing when the touch-up operation is performed, and record the captured image in the external recording medium 91.

In step S310, if the system control device 50 determines that the main shooting target is not motionless and is moving (NO in step S310), in step S313, the system control device 50 displays the continuous shooting switch at a position relative to the position where the touch-down operation is performed. In other words, the system control device 50 enables an operation for selecting continuous shooting, as will be described below, provided that the main shooting object is not motionless.

In step S314, the system control device 50 determines whether the user moves his/her finger (performs the move operation) to the position of the continuous shooting switch displayed in step S313 while keeping touching the screen from the touch-down operation. If the user does not move his/her finger (does not perform the move operation) from the position where the user performs the touch-down operation to the position of the continuous shooting switch (NO in step S314), in step S315, the system control device 50 disables the continuous shooting function. Then, the processing returns to step S311. In steps S311 and S312, the system control device 50 causes the digital camera 100 to perform single shooting.

If the user moves his/her finger (performs the move operation) from the position where the user performs the touch-down operation to the position of the continuous shooting switch while running his/her finer on the screen (YES in step S314), in step S316, the system control device 50 enables the continuous shooting function.

In step S317, the system control device 50 automatically sets a shooting interval of the continuous shooting according to the movement of the main shooting target. If the main shooting target in the screen moves much or at high speed, a short interval is set as the shooting interval of the continuous shooting. The digital camera 100 performs the continuous shooting at high speed, and can capture an image of the rapidly moving main shooting target without missing a decisive moment. At this time, the shutter speed can be adjusted according to the speed of the movement of the main shooting target. For example, the shutter speed is controlled so as to be increased as the speed of the movement of the shooting target is increased, so that a blur of the shooting target can be reduced. It is desirable that the diaphragm or the ISO (International Organization for Standardization) sensitivity is adjusted together with the shutter speed to realize an optimum exposure.

In step S318, the system control device 50 determines whether the touch-up operation is performed on the touch panel 70. If the system control device 50 determines that the touch-up operation is performed on the touch panel 70 (YES in step S318), the system control device 50 advances the processing to step S319.

In step S319, the system control device 50 displays a guidance indicating that the continuous shooting is in progress on the screen of the display unit 23. By this guidance, the digital camera 100 can notify the user of the progress status of the continuous shooting, how to stop the continuous shooting, or the like.

In step S320, the system control device 50 causes the digital camera 100 to capture an image, and record the captured image data in the external recording medium 91.

In step S321, the system control device 50 determines whether a predetermined number of images is captured by the continuous shooting. If the predetermined number of images is captured (YES in step S321), the system control device 50 advances the processing to step S325 and ends the continuous shooting. If the predetermined number of images is not captured (NO in step S321), the system control device 50 advances the processing to step S322.

In step S322, the system control device 50 adjusts a shooting interval to the next shooting so as to achieve the continuous shooting interval set in step S317.

In step S323, the system control device 50 determines whether the touch-down operation is performed. If the touch-down operation is not performed (NO in step S323), the system control device 50 returns the processing to step S319, and then causes the digital camera 100 to repeatedly capture images to continue the continuous shooting. If it is determined that the touch-down operation is performed (YES in step S323), the system control device 50 ends the continuous shooting, and is kept in a standby state until the touch-up operation is performed in step S324. If the touch-up operation is performed in step S324 (YES in step S324), in step S325, the system control device 50 disables the continuous shooting function. The processing thereafter is similar to that of the first exemplary embodiment.

According to the present exemplary embodiment, the continuous shooting switch is displayed for a scene that is supposed to be effectively captured by continuous shooting, such as a scene containing a moving target, allowing the user to select continuous shooting at that moment. This configuration can increase a possibility to utilize the continuous shooting function. Further, the continuous shooting switch is not displayed when continuous shooting is not effective, so that the visibility of a through-the-lens image may not be disturbed.

Figure 4A:
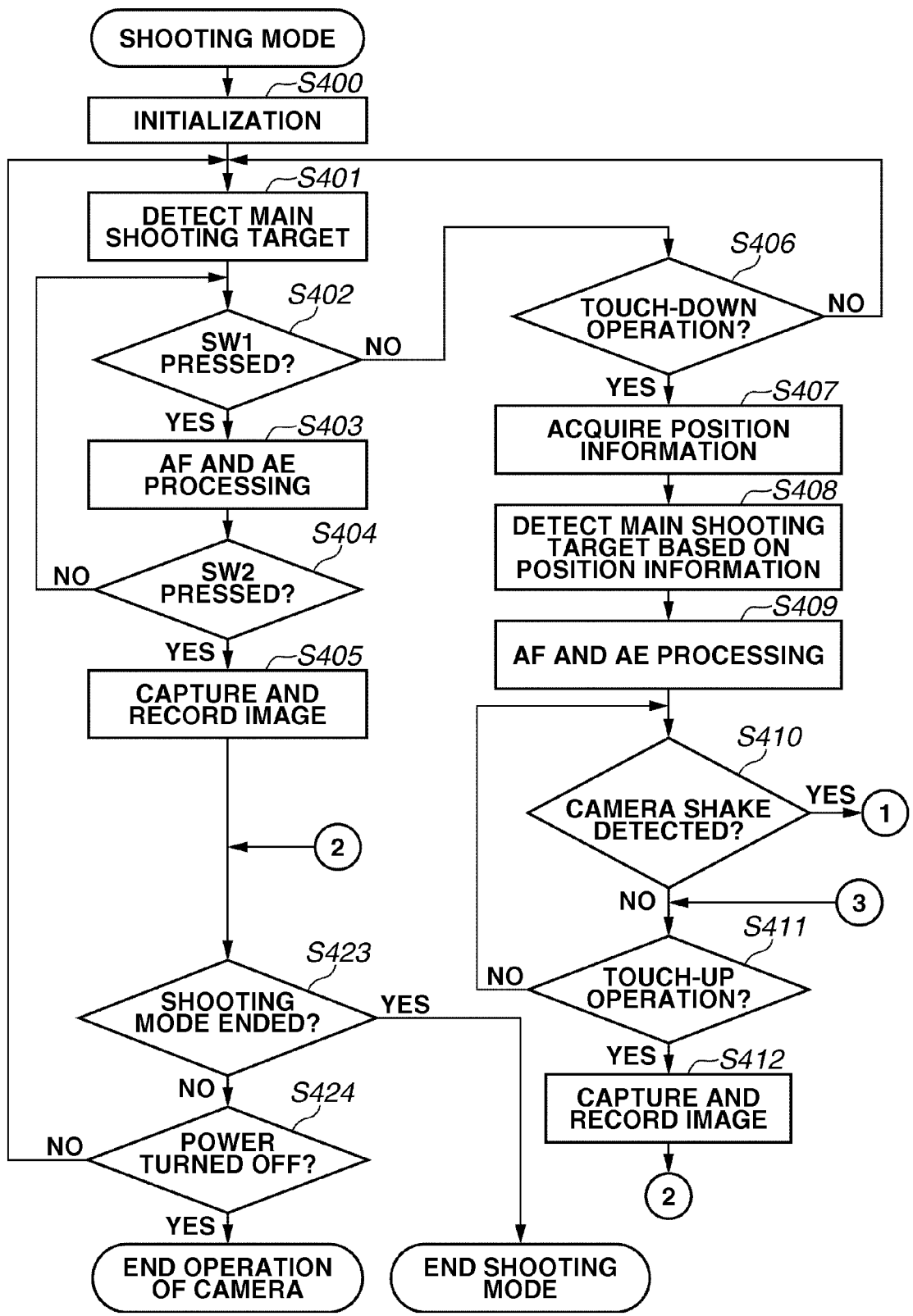
FIGS. 4A and 4B are flowcharts illustrating shooting processing according to a third exemplary embodiment.
Figure 4B:
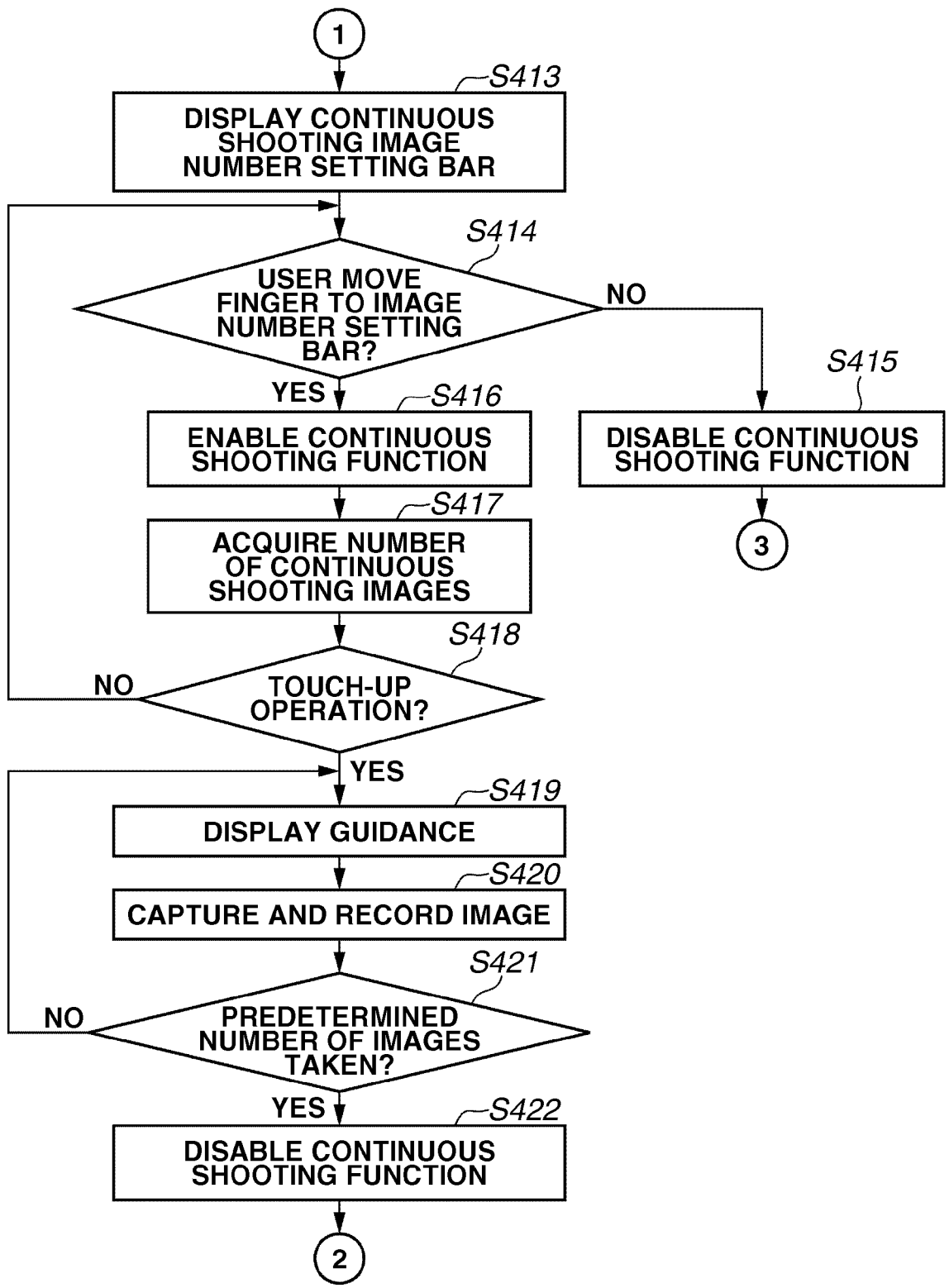

A third exemplary embodiment will be described as an example in which the digital camera 100 recommends continuous shooting to a user when a camera shake or a device shake occurs in the digital camera 100. FIGS. 4A and 4B are flowcharts illustrating processing by the digital camera 100 during shooting according to the present exemplary embodiment. The program recorded in the non-volatile memory 51 is loaded to the memory 25 to be executed by the system control device 50, so that the processing illustrated in FIGS. 4A and 4B is realized.

The processing in steps S400 to S409 is similar to that in steps S200 to S209, and therefore the detailed description thereof will be omitted.

In step S410, the system control device 50 determines whether a camera shake occurs in the digital camera 100. More specifically, the camera shake detection unit 72 detects a camera shake amount of the digital camera 100, and notifies the system control device 50 of the amount. The system control device 50 determines whether the camera shake occurs in the digital camera 100 based on whether the detected camera shake amount notified from the camera shake detection unit 72 exceeds a threshold value. If the camera shake is not detected (NO in step S410), then in steps S411 and S412, the system control device 50 causes the digital camera 100 to capture an image at the timing when the touch-up operation is performed, and record the captured image in the external recording medium 91.

Figure 8:
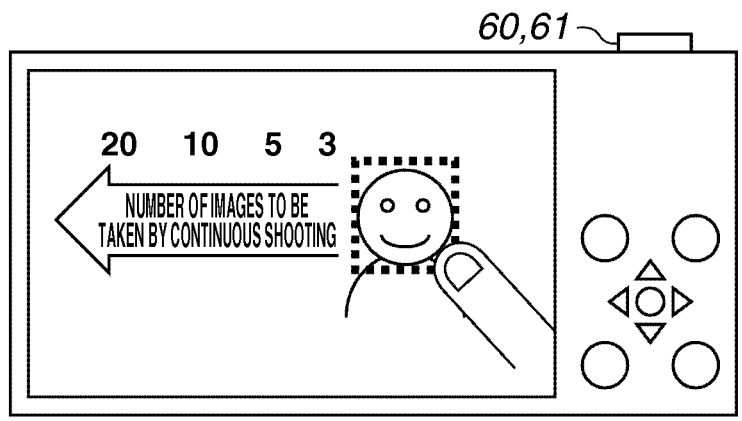
FIG. 8 illustrates an example of a display screen according to the third exemplary embodiment.

If the camera shake is detected in step S410 (YES in step S410), then in step S413, the system control device 50 displays a continuous shooting image number setting bar, which allows a user to instruct the digital camera 100 to capture a desired number of images by continuous shooting, at a position relative to the position where the touch-down operation is performed in step S413. FIG. 8 illustrates a display example of the continuous shooting image number setting bar. The displayed numerical values indicate the number of images to be captured during continuous shooting.

In step S414, the system control device 50 determines whether the user moves his/her finger (performs the move operation) on the continuous shooting image number setting bar displayed in step S413 while keeping touching the screen from the touch-down operation. If the user does not move his/her finger (does not perform the move operation) from the position where the user performs the touch-down operation (NO in step S414), in step S415, the system control device 50 disables the continuous shooting function. Then, the processing returns to step S411. In steps S411 and 412, the digital camera 100 performs single shooting.

If the user moves his/her finger from the position where the user performs the touch-down operation on the continuous shooting image number setting bar while running his/her finger on the screen (YES in step S414), in step S416, the system control device 50 enables the continuous shooting function. In step S417, the system control device 50 sets the number of images to be captured during the continuous shooting according to a movement amount that the user moves his/her finger (performs the move operation) on the continuous shooting image number setting bar.

In step S418, the system control device 50 determines whether the touch-up operation is performed on the touch panel 70. If the system control device 50 determines that the touch-up operation is performed on the touch panel 70 (YES in step S418), the system control device 50 advances the processing to step S419.

In step S419, the system control device 50 displays a guidance indicating that the continuous shooting is in progress on the screen of the display unit 23. By this guidance, the digital camera 50 can notify the user of the progress status of the continuous shooting.

In step S420, the system control device 50 causes the digital camera 100 to capture an image, and record the image data of the captured image in the external recording medium 91.

In step S421, the system control device 50 determines whether the number of images captured by the continuous shooting reaches the number of images set via the continuous shooting image number setting bar. If the number of images captured by the continuous shooting reaches the number of images set via the continuous shooting image number setting bar (YES in step S421), the system control device 50 advances the processing to step S422. If the number of images captured by the continuous shooting does not reach the number of images set via the continuous shooting image number setting bar (NO in step S422), the system control device 50 returns the processing to step S419. Then, the system control device 50 causes the digital camera 100 to repeatedly capture images to continue the continuous shooting.

In step S423, the system control device 50 determines whether the mode of the digital camera 100 is switched from the shooting mode to another operation mode using the mode changeover switch. If the mode of the digital camera 100 is changed from the shooting mode (YES in step S423), then the system control device 50 ends the shooting mode.

In step S424, the system control device 50 determines whether the power button is pressed so that the digital camera 100 is instructed to be turned off. If the digital camera 100 is instructed to be turned off (YES in step S424), the system control device 50 terminates the operation of the digital camera 100.

According to the present exemplary embodiment, if a camera shake occurs after the shooting preparation, the user can capture a specified number of images by continuous shooting in consideration of the camera shake. This configuration can prevent a failure in shooting due to the camera shake. Further, the continuous shooting switch is displayed only when the camera shake occurs, and is not displayed when there is no camera shake, so that the visibility of a through-the-lens image may not be disturbed.

Figure 5A:
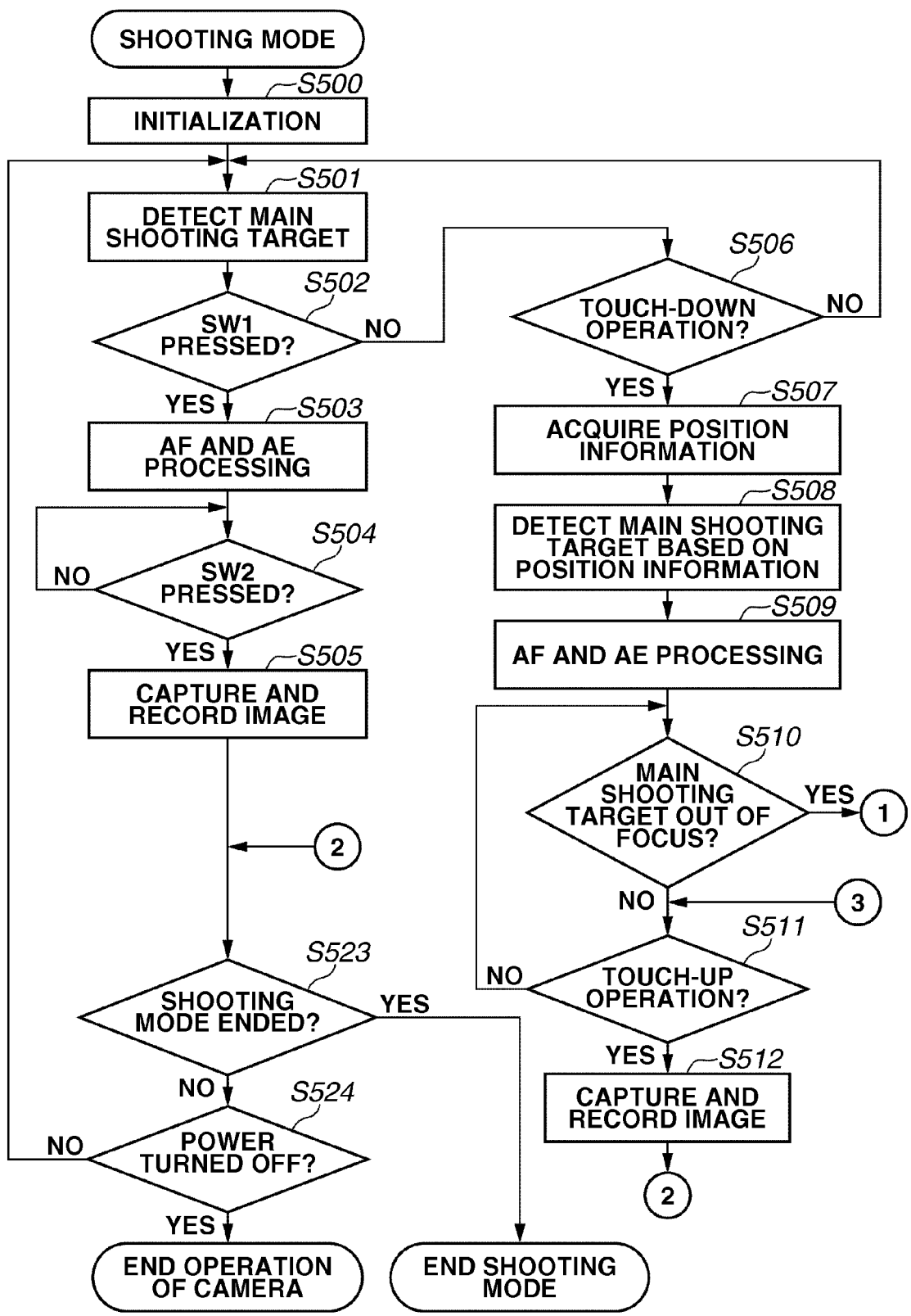
FIGS. 5A and 5B are flowcharts illustrating shooting processing according to a fourth exemplary embodiment.
Figure 5B:
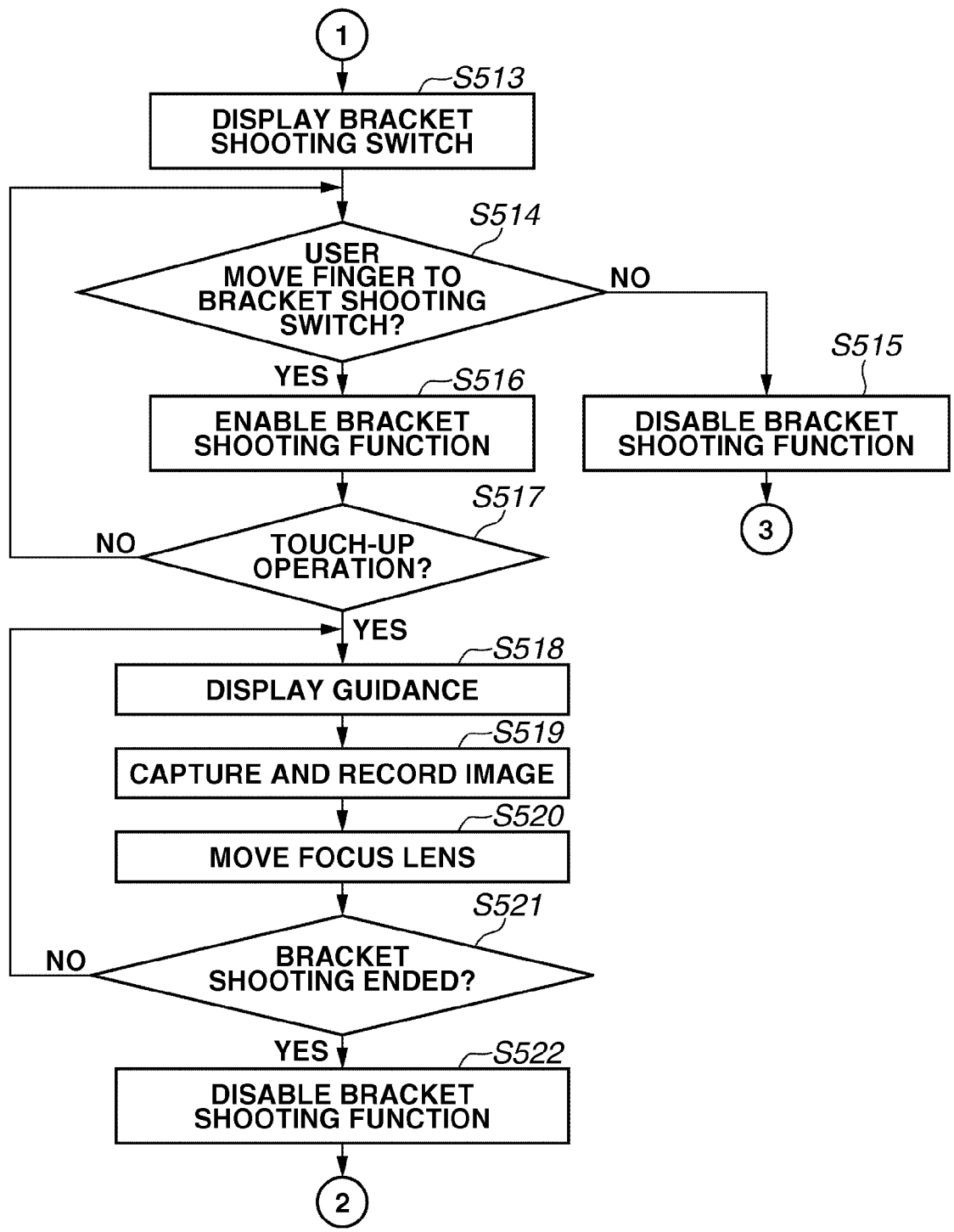

A fourth exemplary embodiment will be described as an example in which the digital camera 100 recommends AF bracket shooting to a user if the digital camera 100 is in an out-of-focus state after the AF processing when the touch-down operation is performed. FIGS. 5A and 5B are flowcharts illustrating the processing during shooting according to the present exemplary embodiment. The program recorded in the non-volatile memory 51 is loaded to the memory 25 to be executed by the system control device 50, so that the processing illustrated in FIGS. 5A and 5B is realized.

The processing in steps S500 to S509 is similar to that in steps S200 to S209, and therefore the detailed description thereof will be omitted.

In step S510, the system control device 50 checks whether it is determined that the main shooting target is out of focus as a result of the AF processing in step S509. The system control device 50 functions as an in-focus degree detection unit. If the main shooting target is correctly in focus (NO in step S510), then in steps S511 and S512, the system control device 50 causes the digital camera 100 to capture an image at the timing when the touch-up operation is performed, and record the captured image to the external recording medium 91.

Figure 9:
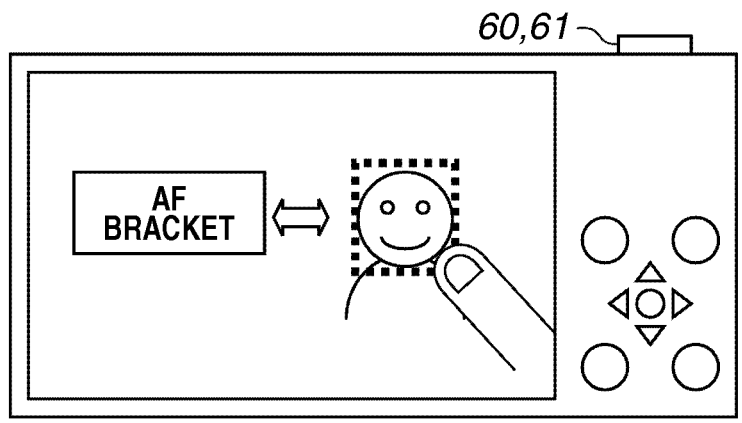
FIG. 9 illustrates an example of a display screen according to the fourth exemplary embodiment.

In step S510, if it is determined that the main shooting target is out of focus (YES in step S510), in step S513, the system control device 50 displays a bracket shooting switch at a position relative to the position where the touch-down operation is performed. FIG. 9 illustrates a display example of the bracket shooting switch.

In step S514, the system control device 50 determines whether the user moves his/her finger (performs the move operation) to the bracket shooting switch (B shooting switch) displayed in S513 while keeping touching the screen from the touch-down operation. If the user does not move his/her finger (does not perform the move operation) from the position where the touch-down operation is performed to the position of the bracket shooting switch (NO in step S514), in step S515, the system control device 50 disables the bracket shooting function. Then, in steps S511 and S512, the system control device 50 causes the digital camera 100 to perform single shooting.

If the user moves his/her finger (performs the move operation) from the position where the touch-down operation is performed to the bracket shooting switch while running his/her finger on the screen (YES in step S514), in step S516, the system control device 50 enables the bracket shooting function.

In step S517, the system control device 50 determines whether the touch-up operation is performed on the touch panel 70. If the system control device 50 determines that the touch-up operation is performed on the touch panel 70 (YES in step S517), the system control device 50 advances the processing to step S518.

In step S518, the system control device 50 displays a guidance indicating that the bracket shooting is in progress on the screen of the display unit 23.

In step S519, the system control device 50 causes the digital camera 100 to capture an image, and record the captured image data in the external recording medium 91.

In step S520, the system control device 50 performs focus lens movement processing. The system control device 50 moves the focus lens from the current position to another position, and establishes an in-focus state at another focal length.

In step S521, the system control device 50 determines whether the digital camera 100 completes shooting by the bracket shooting. If the bracket shooting is not completed (NO in step S521), the system control device 50 returns the processing to step S518. Then, the system control device 50 causes the digital camera 100 to repeatedly capture images to continue the bracket shooting. If the bracket shooting is completed (YES in step S521), in step S522, the system control device 50 disables the bracket shooting function.

In step S523, the system control device 50 determines whether the mode of the digital camera 100 is changed from the shooting mode to another operation mode using the mode changeover switch. If the mode of the digital camera 100 is changed from the shooting mode (YES in step S523), the system control device 50 ends the shooting mode.

In step S524, the system control device 50 determines whether the power button is pressed so that the digital camera 100 is instructed to be turned off. If the digital camera 100 is instructed to be turned off (YES in step S524), the system control device 50 terminates the operation of the digital camera 100.

If the main shooting target is out of focus as a result of the AF processing after the shooting preparation, bracket shooting is performed by changing the focus position, and therefore it is possible to prevent a failure in shooting due to the out-of-focus state.

The digital camera 100 may recommend exposure bracket when the shooting target is too dark or too bright. For example, in step S510 in FIGS. 5A and 5B, the system control device 50 determines whether an image captured as a result of the AF processing and the AE processing is too dark or too bright. If the image is determined too dark or too bright (YES in step S510), the system control device 50 displays an exposure bracket shooting switch. Then, if the user performs the touch-up operation after performing the move operation to the exposure bracket switch, the exposure bracket shooting is performed. During the exposure bracket shooting, shooting is performed at an exposure value corrected based on a reference value into an underexposure side or an overexposure side, respectively.

Figure 6A:
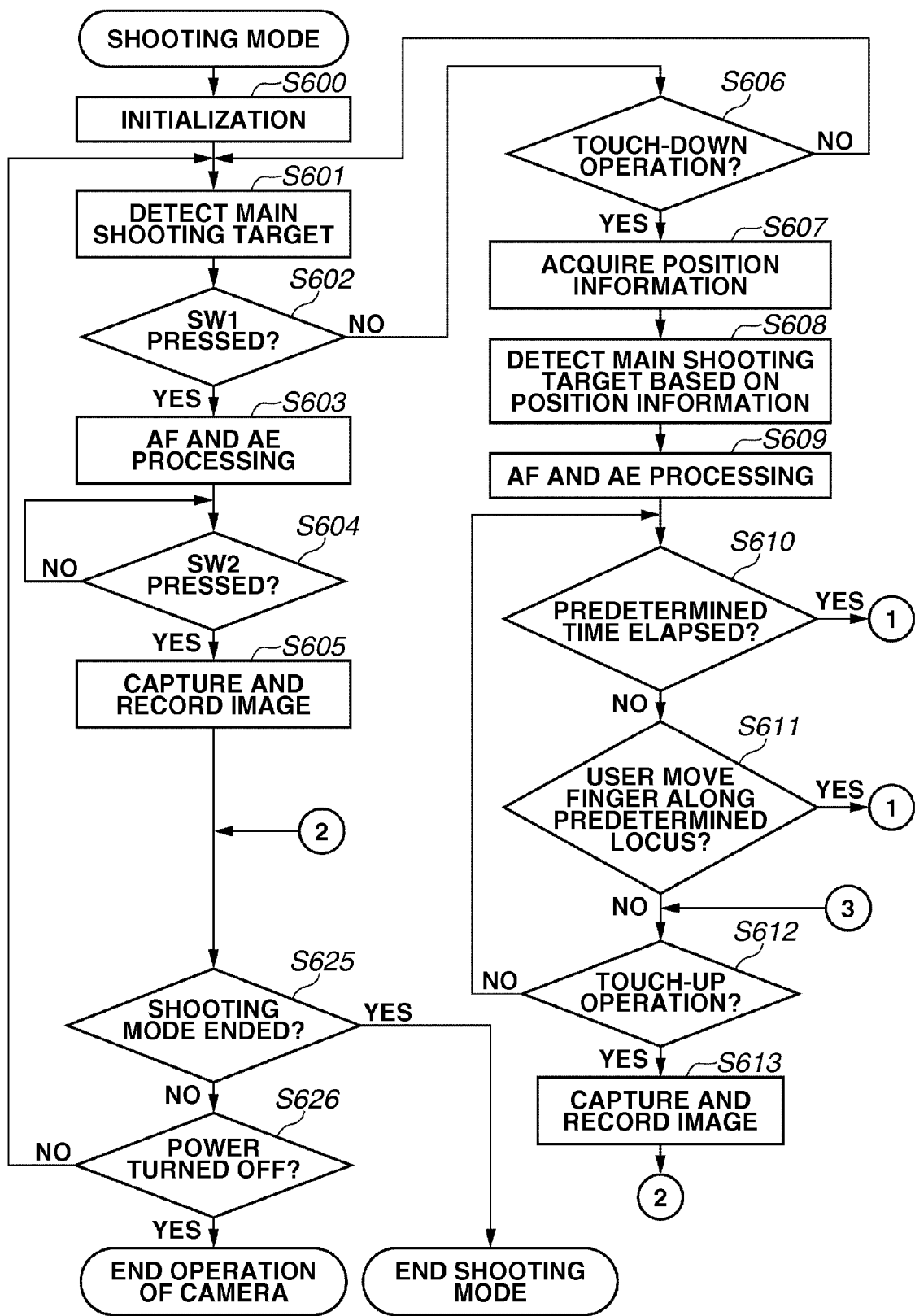
FIGS. 6A and 6B are flowcharts illustrating shooting processing according to a fifth exemplary embodiment.
Figure 6B:
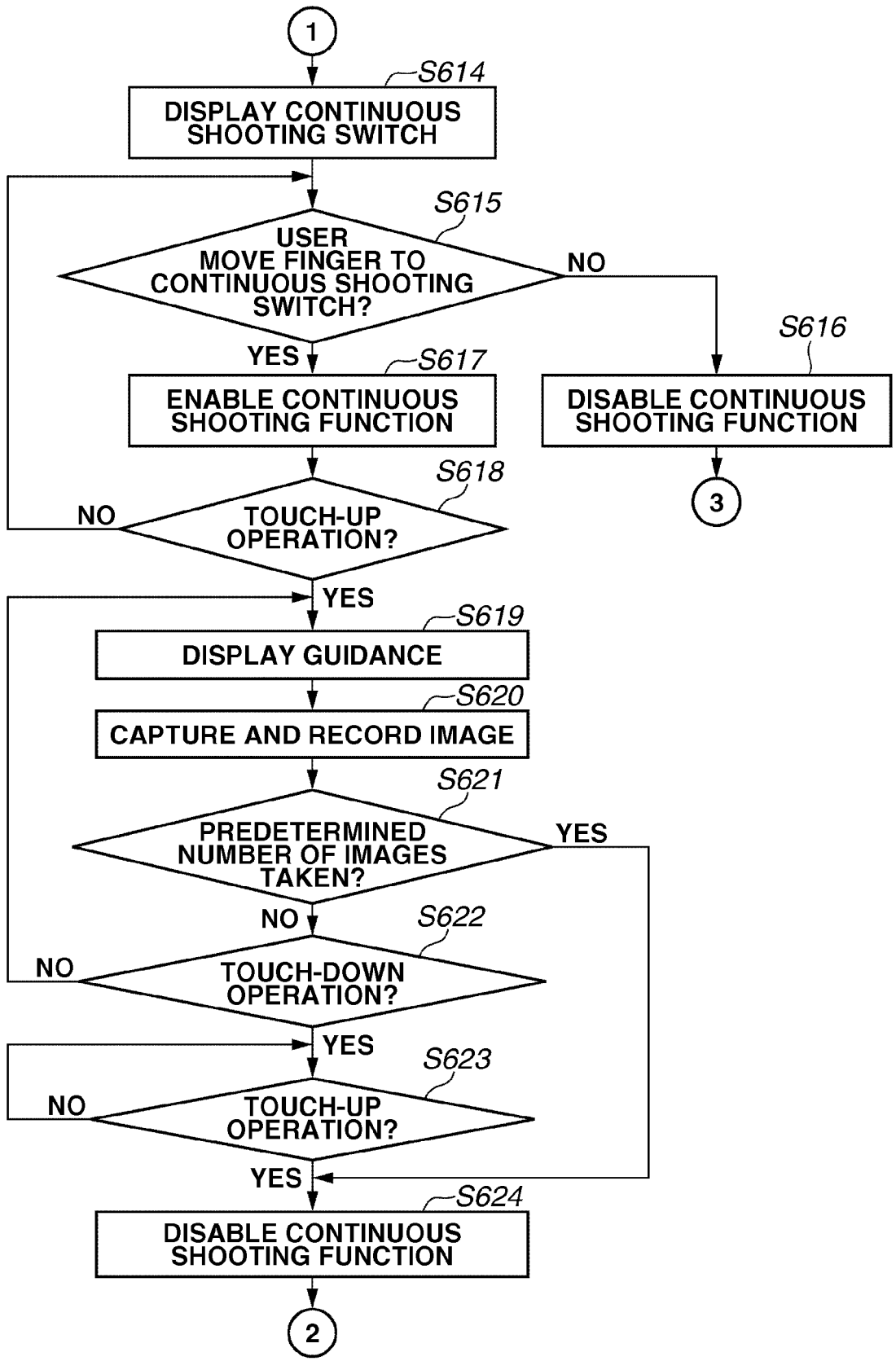

A fifth exemplary embodiment will be described as an example in which the continuous shooting switch is displayed when the touch-on operation is continued for a predetermined time or longer (long-pressing) on the touch panel 70 or a gesture operation for drawing a predetermined locus is performed by the move operation. FIGS. 6A and 6B are flowcharts illustrating the processing during shooting according to the present exemplary embodiment. The program recorded in the non-volatile memory 51 is loaded to the memory 25 to be executed by the system control device 50, so that the processing illustrated in FIGS. 6A and 6B is realized. The processing in steps S600 to S609 is similar to that in steps S200 to S209, and therefore the detailed description thereof will be omitted.

In step S610, the system control device 50 determines whether a predetermined time has elapsed while the touch-down operation is continued. If the predetermined time has not elapsed yet (NO in step S610), the system control device 50 advances the processing to step S611.

In step S611, the system control device 50 determines from the position information acquired from the touch panel 70 whether the user moves his/her finger (performs the move operation) along a predetermined locus on the screen while continuing the touch-down operation. In other words, the system control device 50 determines whether the user performs the move operation while drawing the predetermined specific locus (this move operation is referred to as "gesture operation"). The locus may be set in the digital camera 100 in advance or may be selected and set by a user from the menu or the like. If the user does not move his/her finger (does not perform the move operation) while continuing the touch-down operation (NO in step S611), in steps S612 and 613, the system control device 50 causes the digital camera 100 to capture an image at the timing when the user performs the touch-up operation, and record the captured image in the external recording medium 91.

If the predetermined time has elapsed in step S610 (YES in step S610), or if the user moves his/her finger (performs the move operation) along the predetermined locus while continuing the touch-down operation in step S611 (YES in step S611), the system control device 50 advances the processing to step S614.

In step S614, the system control device 50 displays the continuous shooting switch, which allows the user to instruct the digital camera 100 to perform continuous shooting, at a position relative to the position where the touch-down operation is performed.

In step S615, the system control device 50 determines whether the user moves his/her finger (performs the move operation) to the position of the continuous shooting switch while keeping touching the screen from the touch-down operation. If the user does not move his/her finger (does not perform the move operation) from the position where the touch-down operation is performed to the position of the continuous shooting switch (NO in step S615), in step S616, the system control device 50 disables the continuous shooting function. Then, in steps S612 and 613, the system control device 50 causes the digital camera 100 to perform single shooting. If the user moves his/her finger (performs the move operation) from the position whether the user performs the touch-down operation to the position of the continuous shooting switch while running his/her finger on the screen (YES in step S615), in step S617, the system control device 50 enables the continuous shooting function.

In step S618, the system control device 50 determines whether the touch-up operation is performed on the touch panel 70. If the system control device 50 determines that the touch-up operation is performed on the touch panel 70 (YES in step S618), the system control device 50 advances the processing to step S619.

In step S619, the system control device 50 displays a guidance indicating that the continuous shooting is in progress on the screen of the display unit 23. By this guidance, the digital camera 100 can notify the user of the progress status of the continuous shooting, how to stop the continuous shooting, or the like.

In step S620, the system control device 50 causes the digital camera 100 to capture an image, and record the captured image data to the external recording medium 91.

In step S621, the system control device 50 determines whether a predetermined number of images is captured by the continuous shooting. If the predetermined number of images is captured (YES in step S621), the system control device 50 advances the processing to step S624. If the predetermined number of images is not captured (NO in step S621), the system control device 50 advances the processing to step S622.

In step S622, the system control device 50 determines whether the touch-down operation is performed. If the touch-down operation is not performed (NO in step S622), the processing returns to step S619, in which the system control device 50 causes the digital camera 100 to repeatedly capture images to continue the continuous shooting. If the system control device 50 determines that the touch-down operation is performed (YES in step S622), the system control device 50 ends the continuous shooting, and is kept in a standby state until the touch-up operation is performed in step S623. If the touch-up operation is performed (YES in step S623), then in step S624, the system control device 50 disables the continuous shooting function.

In step S625, the system control device 50 determines whether the mode of the digital camera 100 is changed from the shooting mode to another operation mode using the mode changeover switch. If the mode of the digital camera 100 is changed from the shooting mode (YES in step S625), the system control device 50 ends the shooting mode.

In step S626, the system control device 50 determines whether the power button is pressed so that the digital camera 100 is instructed to be turned off. If the digital camera 100 is instructed to be turned off (YES in step S626), the system control device 50 terminates the operation of the digital camera 100.

In the present exemplary embodiment, the continuous shooting switch is displayed when the user continues the touch-on operation on the touch panel 70 for a predetermined time or longer (long-pressing) or performs the gesture operation for drawing the predetermined locus by the move operation as an intentional operation for starting continuous shooting. If the user does not perform an operation intended to start continuous shooting, the continuous shooting switch is not displayed, so that the visibility of a through-the-lens image may not be disturbed unnecessarily.

In the flowchart illustrated in FIGS. 6A and 6B, step S610 may be omitted so that the continuous shooting switch is not displayed even when the touch-on operation is continued on the touch panel 70 for the predetermined time or longer (long-pressing). Since the AF processing and the AE processing are performed according to the touch-down operation and completed before the touch-up operation, a time lag can be reduced between the touch-up operation and execution of recording processing, so that it is easy for the user to acquire a recorded image as intended. In consideration of this feature, one possible use situation is that, after the touch-down operation, the user waits for a photo opportunity that the shooting target is ready for shooting while maintaining the touch-on operation, and then the user performs the touch-up operation at the best timing. In other words, even when the user is not intended to perform continuous shooting, the touch-on operation may be continued for the predetermined time or longer. The present exemplary embodiment can handle this use situation in a case where it is configured to refrain from displaying the continuous shooting switch even when the touch-on operation is continued on the touch panel 70 for the predetermined time or longer (long-pressing).

The method for displaying the continuous shooting switch and the method for specifying the number of images to be captured by continuous shooting illustrated in FIG. 8 can be applied to the above-described respective exemplary embodiments.

Both a target range of the AF processing and a target range of the AE processing are not limited to a main shooting target detected by the shooting target detection unit 71. A range specified by the user on the touch panel 70 may be set as the target of the AF processing and the AE processing. The target range of the AF processing and the target range of the AE processing may be different from each other.

In the above-described plurality of exemplary embodiments, the touch-up operation triggers continuous shooting or single shooting. However, the digital camera 100 may be configured in such a manner that touching a specific area on the touch panel 70, for example the periphery of the touch panel 70, can trigger cancellation of continuous shooting or single shooting.

The control by the system control device 50 may be realized by a single hardware piece or may be distributed to a plurality of hardware pieces to be realized collectively.

The above-described exemplary embodiments are only examples of embodiments of the claimed invention, and they may be combined as necessary within the scope of the claimed invention.

The exemplary embodiments have been described based on examples in which the claimed invention is applied to a digital camera. However, the claimed invention is not limited by this example, and generally, the claimed invention can be applied to any imaging apparatus including an imaging unit and a touch panel. In other words, the claimed invention can be applied to, for example, a personal computer equipped with a camera, a personal digital assistance (PDA), a mobile phone terminal equipped with a camera, a music player equipped with a camera, a game machine equipped with a camera, and an electronic book reader equipped with a camera. Especially, in recent years, for example, a mobile phone terminal (for example, a smartphone), a camera-equipped game machine, an electronic book reader, and a table personal computer (PC) configured to be controlled by an operation with use of, mainly, a touch panel have become widespread. Many of these apparatuses are not provided with a shutter button that a user can press halfway or fully in a similar manner to conventional digital cameras, and require an operation on a touch panel for shooting. Therefore, it is especially effective to apply the claimed invention to these apparatuses.

Aspects of the claimed invention can also be realized by a computer of a system or apparatus (or devices such as a central processing unit (CPU), a microprocessing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the claimed invention has been described with reference to exemplary embodiments, it is to be understood that the claimed invention is not limited to the disclosed exemplary embodiments. The scope of the following claims is to be accorded the broadest interpretation so as to encompass all modifications, equivalent structures, and functions.

This application claims priority from Japanese Patent Application No. 2011-196786 filed Sep. 9, 2011, which is hereby incorporated by reference herein in its entirety.

What is claimed is:
1. An imaging apparatus comprising:
an imaging unit;
a touch panel;
an imaging preparation unit configured to conduct a preparation for imaging processing of the imaging unit based in response to a touch-down operation on the touch panel; and a control unit configured to cause the imaging unit to perform continuous shooting in response to a touch-up operation in a case where an operation for instructing about continuous shooting is performed on the touch panel since the touch-down operation until the touch-up operation, and cause the imaging unit to perform single shooting in response to the touch-up operation in a case where the operation for instructing about continuous shooting is not performed on the touch panel since the touch-down operation until the touch-up operation, wherein, in a case where continuous shooting is performed based on the touch-up operation, the control unit controls the imaging unit to shoot a number of images based on a moving amount from a touch-down position.

2. An imaging apparatus comprising:
an imaging unit;
a touch panel;
an imaging preparation unit configured to conduct a preparation for imaging processing of the imaging unit based in response to a touch-down operation on the touch panel;
a control unit configured to cause the imaging unit to perform continuous shooting in response to a touch-up operation in a case where an operation for instructing about continuous shooting is performed on the touch panel since the touch-down operation until the touch-up operation, and cause the imaging unit to perform single shooting in response to the touch-up operation in a case where the operation for instructing about continuous shooting is not performed on the touch panel since the touch-down operation until the touch-up operation; and
a unit configured to detect a movement of a main shooting target,
wherein the control unit is configured to allow the operation for instructing about continuous shooting to be performed on the touch panel in a case where a movement of the main shooting target is detected.

3. An imaging apparatus comprising:
an imaging unit;
a touch panel;
an imaging preparation unit configured to conduct a preparation for imaging processing of the imaging unit based in response to a touch-down operation on the touch panel;
a control unit configured to cause the imaging unit to perform continuous shooting in response to a touch-up operation in a case where an operation for instructing about continuous shooting is performed on the touch panel since the touch-down operation until the touch-up operation, and cause the imaging unit to perform single shooting in response to the touch-up operation in a case where the operation for instructing about continuous shooting is not performed on the touch panel since the touch-down operation until the touch-up operation; and
a unit configured to detect an apparatus shake of the imaging apparatus,
wherein the control unit is configured to allow the operation for instructing about continuous shooting to be performed on the touch panel in a case where the apparatus shake is detected, and
wherein the operation for instructing about continuous shooting on the touch panel is an operation for setting a number of images to be captured by the continuous shooting.

4. An imaging apparatus comprising:
an imaging unit;
a touch panel;
an imaging preparation unit configured to conduct a preparation for imaging processing of the imaging unit based in response to a touch-down operation on the touch panel;
a control unit configured to cause the imaging unit to perform continuous shooting in response to a touch-up operation in a case where an operation for instructing about continuous shooting is performed on the touch panel since the touch-down operation until the touch-up operation, and cause the imaging unit to perform single shooting in response to the touch-up operation in a case where the operation for instructing about continuous shooting is not performed on the touch panel since the touch-down operation until the touch-up operation; and
a unit configured to detect an in-focus degree of the imaging unit,
wherein the control unit is configured to allow the operation for instructing about continuous shooting to be performed on the touch panel in a case where the in-focus degree of the imaging unit indicates an out-of-focus state, and
wherein the control unit causes the imaging unit to perform continuous shooting while changing a focal length of the imaging unit for each imaging processing according to the touch-up operation in a case where the operation for instructing about continuous shooting is performed on the touch panel before execution of the touch-up operation on the touch panel.

5. The imaging apparatus according to claim 1, further comprising a unit configured to allow the operation for instructing about continuous shooting to be performed on the touch panel according to either a touch continuing for a predetermined time on the touch panel or a movement along a predetermined locus on the touch panel.

6. The imaging apparatus according to claim 1, wherein the control unit stops the continuous shooting if the number of images based on the moving amount is captured.

7. The imaging apparatus according to claim 1, wherein the control unit stops the continuous shooting according to a touch on the touch panel during the continuous shooting.

8. A method for controlling an imaging apparatus which includes an imaging unit and a touch panel and is configured to conduct a preparation for imaging processing of the imaging unit in response to a touch-down operation on the touch panel and capture an image in response to a touch-up operation on the touch panel, the method comprising:
determining whether an operation for instructing about continuous shooting is performed on the touch panel since a touch-down operation until a touch-up operation;
causing the imaging unit to perform continuous shooting in response to the touch-up operation in a case where the operation for instructing about continuous shooting is performed on the touch panel since the touch-down operation until the touch-up operation; and
causing the imaging unit to perform single shooting in response to the touch-up operation in a case where the operation for instructing about continuous shooting is not performed on the touch panel since the touch-down operation until the touch-up operation,
wherein, in a case where continuous shooting is performed based on the touch-up operation, causing the imaging unit to shoot a number of images based on a moving amount from a touch-down position.

9. A non-transitory computer-readable recording medium storing a program for executing a method for controlling an imaging apparatus which includes an imaging unit and a touch panel and is configured to conduct a preparation for imaging processing of the imaging unit in response to a touch-down operation on the touch panel and capture an image in response to a touch-up operation on the touch panel, the method comprising:
- determining whether an operation for instructing about continuous shooting is performed on the touch panel since a touch-down operation until a touch-up operation;
- causing the imaging unit to perform continuous shooting in response to the touch-up operation in a case where the operation for instructing about continuous shooting is performed on the touch panel since the touch-down operation until the touch-up operation; and
- causing the imaging unit to perform single shooting in response to the touch-up operation in a case where the operation for instructing about continuous shooting is not performed on the touch panel since the touch-down operation the touch-up operation,
- wherein, in a case where continuous shooting is performed based on the touch-up operation, causing the imaging unit to shoot a number of images based on a moving amount from a touch-down position.

10. An imaging apparatus comprising:
- an imaging unit;
- a touch panel;
- an imaging preparation unit configured to conduct a preparation for imaging processing of the imaging unit based in response to a touch-down operation on the touch panel; and
- a control unit configured to cause the imaging unit to perform continuous shooting in response to a touch-up operation in a case where an operation for instructing about continuous shooting is performed on the touch panel since the touch-down operation until the touch-up operation, and cause the imaging unit to perform single shooting in response-to the touch-up operation in a case where the operation for instructing about continuous shooting is not performed on the touch panel since the touch-down operation until the touch-up operation,
- wherein the operation for instructing about continuous shooting on the touch panel is an operation for setting a number of images to be captured by the continuous shooting according to a moving amount from a touch-down position.

* * * * *